Oct. 9, 1945.　　　　I. F. PROAPS　　　　2,386,504
SELF-CENTERING CURING BAG FOR TIRE SECTION MOLDS
Filed Nov. 20, 1942　　　2 Sheets-Sheet 1
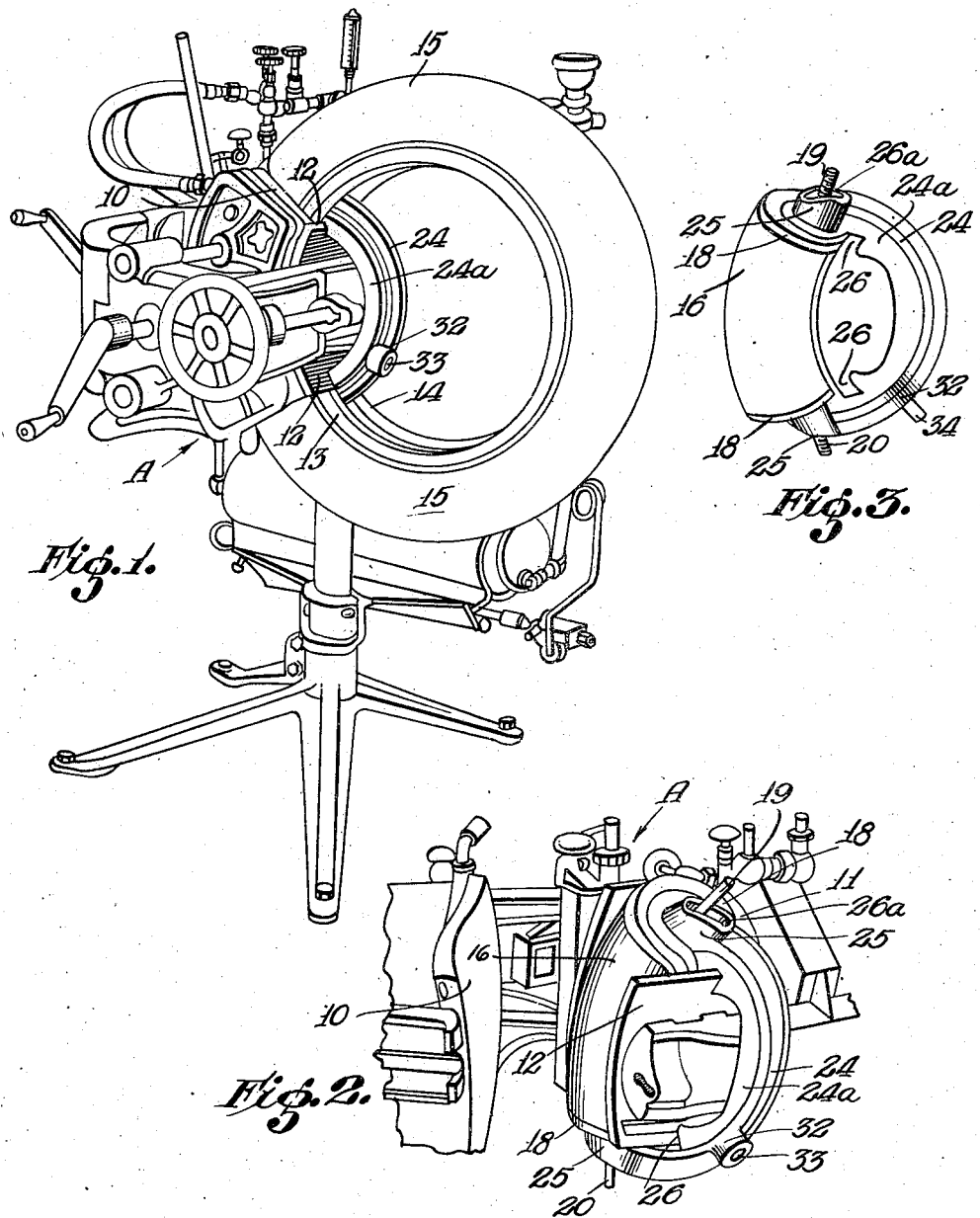

Oct. 9, 1945.     I. F. PROAPS     2,386,504
SELF-CENTERING CURING BAG FOR TIRE SECTION MOLDS
Filed Nov. 20, 1942     2 Sheets-Sheet 2
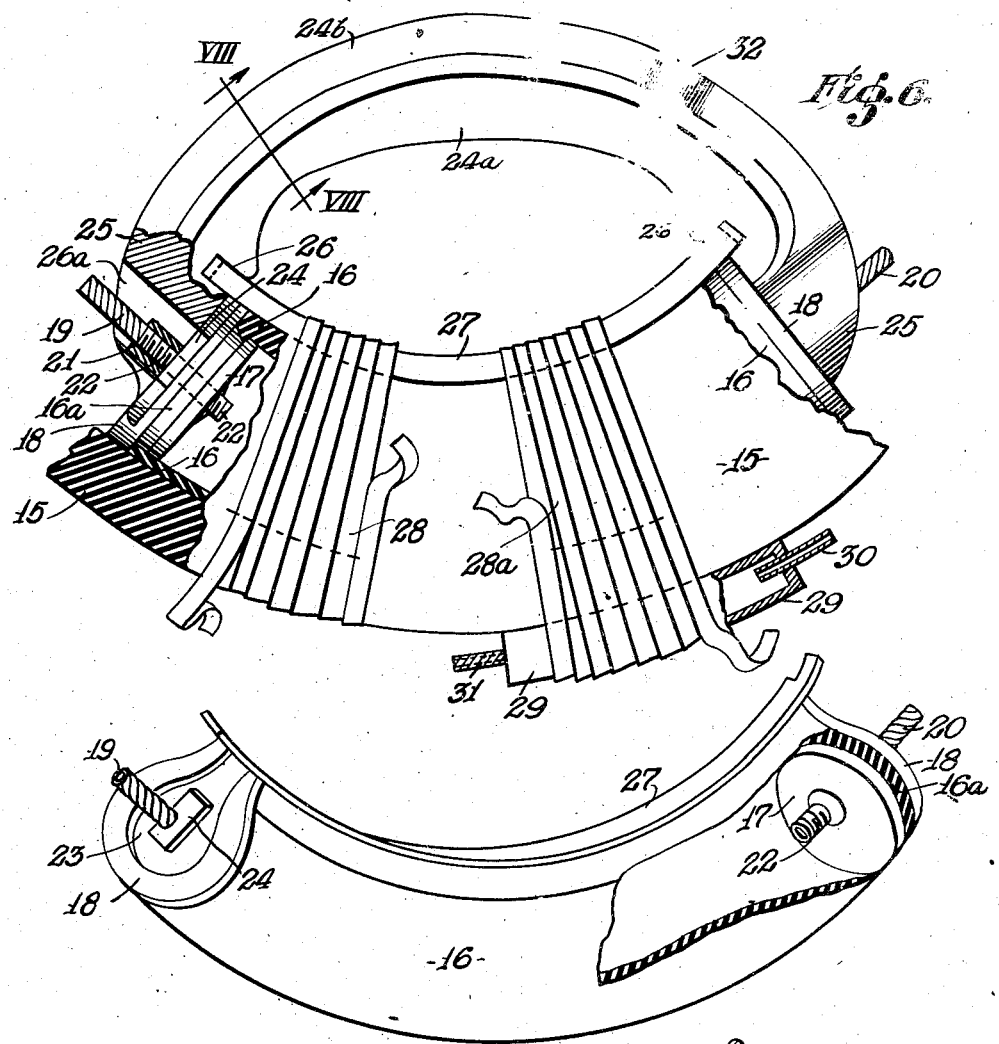
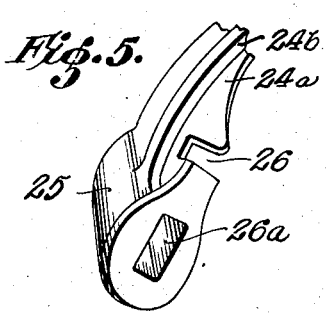
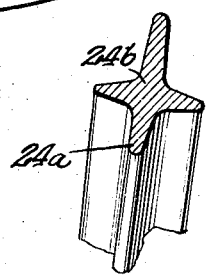
INVENTOR:
IRWIN F. PROAPS,
BY M. Y. Charles
ATTORNEY Patented Oct. 9, 1945

2,386,504

UNITED STATES PATENT OFFICE 2,386,504

SELF-CENTERING CURING BAG FOR TIRE SECTION MOLDS

Irwin F. Proaps, Wichita, Kans.

Application November 20, 1942, Serial No. 466,380

4 Claims. (Cl. 18—45)

My invention relates to an improvement in self centering curing bags for tire section molds.

Heretofore these bags have been made of rubber, the walls of which have been extremely thick and the ends have been made very heavy in order that the bag would stand the heat and pressure that it was subjected to when it was used. These bags are the type that are placed inside a tire in the process of repairing sections of the tire. The bad faults of these bags have been that the heat and pressure that the bags were subjected to caused them to elongate and therefore shrink from their proper diametrical size and therefore soon deteriorate and be short lived from breakage and produce the proper pressure on the tire during the process of the repair being made. Due to the amount of rubber container in the bag and the short life thereof, the bags were excessively expensive.

In view of the foregoing difficulties and objectionable features of the bags I have developed my improved curing bag that is designed to overcome these difficulties as well as having other desirable features as follows;

My improved curing bag device provides a bag made of rubber and having thin walls so that the bag will readily expand under steam pressure introduced therein so as to place desirable pressure on the place being repaired in the tire; the thin wall also transmits heat readily and quickly to the portion of the tire being repaired.

A further object is to provide a curing bag of the kind mentioned that is provided with a rigid frame element detachably attached thereto that provides a means of preventing the elongation of the bag when the bag is under steam pressure and therefore the diametrical dimension of the bag is retained throughout the life of the bag which is materially increased due to the construction and use of the bag.

A still further object is that the bag contains only a small amount of rubber and is therefore much cheaper and easier to make.

Another object is that numerous sized bags may be made to fit various sized tires and all these bags may be mounted within the above mentioned frame so that a tire shop may have and use a large stock of various sized curing bags without having to have so many frames on hand.

A still further object is that the frame is so made that it may be used independent of conventional tire mold machines, or the curing bag device may be used in conjunction with conventional tire section mold machines.

Still another object is that when the curing bag device is used in conjunction with a tire section mold machine the frame of the device is so designed that when the machine is closed about a tire the curing bag will be centered in the tire being repaired.

These and other objects will be more fully described as this description progresses.

Now referring to the accompanying drawings:

Fig. 1 is a perspective view of a conventional type of a sectional tire mold machine showing a tire positioned therein and showing my improved self centering curing bag device being used in connection therewith.

Fig. 2 is a perspective view of a portion of the machine shown in Fig. 1, the tire mold section being opened so as to show more clearly the position of the tire and mold bag device as used in connection with the mold machine.

Fig. 3 is a side view of the assembled curing bag and frame therefor.

Fig. 4 is a detail perspective view of the curing bag, parts being broken away for convenience of illustration.

Fig. 5 is a perspective view of one end of the frame support for the bag, both ends of the frame being the same.

Fig. 6 is a side view of the curing bag and supporting frame, and having a tire mounted thereon, and illustrating how the device is used independent of any other machine; parts are broken away in this view for convenience of illustration.

Fig. 7 is a detail sectional view through the curved frame element, the view being taken along the line VII—VII in Fig. 6, and looking in the direction of the arrows.

In the drawings is shown a conventional tire section mold machine A having two steam heated mold elements 10 and 11 that are hinged together so that a tire may be placed therebetween and removed therefrom by closing and opening the outside mold section 10 and 11.

The mold 11 is provided with a curved shoe 12 against which the inside face of the beads 13 and 14 of the tire 15 rests to properly position the tire in the mold.

The curing bag device comprises a hollow rubber element 16 that is curved and fashioned to fit the inner surface of the tire 15. The ends 16a of the bag 16 are flat and are an integral part of the bag 16.

In the bag 16 and at each end thereof is positioned a metal plate 17 that substantially fills the end of the bag 16 and rests against the rubber ends 16a of the bag.

At each end of the bag 16 and on the outside thereof is a second plate 18 fashioned to fit the inside shape of the tire 15.

At 19 and 20 is shown tubular elements that are threaded into a coupling 21 into which one end of a second tubular element 22 is threaded. The other end of the tube 22 is threaded into the inner-plate 17 and as the tube 22 is turned to further advance the tube 22 through the plate 17 the coupling 21 engages the outer plate 18 thereby drawing the two plates 17 and 18 toward each other and thereby clamping the rubber end elements 16a between the plates 17 and 18, this construction exists at each end of the bag.

A steam hose having a control valve therein, (not shown) may be connected to the tubular element 19, and a second exhaust hose having a control valve therein (not shown), may be attached to the tubular element 20 as a drain line for condensed steam or water, that will accumulate in the bag 15.

The plates 18 are provided with a recessed portion 23 in which is centrally positioned a boss 24 through which the tubular element 22 slidably passes.

The bag assembly is provided with a curved frame or support member 24b the cross section of which is a cruciform shape. On each end of the frame 24b is a head element 25. The opposing faces of the heads 25 are identical and are fashioned to snugly fit within the recess 23 in the plates 18. The heads 25 are provided with holes 26a therethrough and through which the tubular elements 19 and 20 pass and in which the bosses 24 are positioned so as to accurately hold the bag 16 in its proper position between the heads 25 of the frame element 24b.

The inner flange 24a of the frame 24b is provided with indentures 26 adjacent the heads 25. These indentures 26 receive the ends of the curved shoe 12 of the tire section mold A so that the bag 16 is properly positioned in the mold and in proper position within the tire 15 as shown.

If the bag is to be used without the mold a curved piece of iron 27 may be seated in the indentures 26 to form a curved shoe against which the beads 13 and 14 may be seated to properly hold the bag 16 in the tire 15.

If the repair job is to be done without the use of a section mold machine such as shown in Figures 1 and 2, the tire may be placed on the curing bag and supporting frame 15—24b—27 in the manner shown in Fig. 6 whereupon the tire 15 and curved shoe 27 may be wrapped with fabric strips 28 so as to secure the tire on the curing device so that pressure and heat may be supplied or applied to the interior of the tire by the curing bag at the place being repaired.

If heat is required on the outside of the tire as well as inside a steam chest 29 may be bound against the exterior of the tire by the wrapping strips 28a as shown in Fig. 6.

The stem chest is provided with a tubular inlet 30 and an exhaust tube 31 so that steam may be entered into the chest 29 and the condensed steam, water, may be drained from the chest 29 through the tubular element 31.

The frame 24b is provided with a boss 32 having a hole 33 therein in which may be seated a pin 34 that may be positioned in a hole in any suitable supporting element (not shown) so as to hold the curing bag 16 in a tilted position so that water collecting therein from condensed steam may be readily drained from the bag 16.

Such modifications of my invention may be employed as lie within the scope of the appended claims without departing from the spirit and intention of the invention. Now having fully shown and described my invention, what I claim is:

1. In a curing bag device for repairing tire section; a thin walled rubber bag fashioned in the shape of a segment of a circle to conform to the shape of the interior shape of a tire, the ends of said bag being made rigid by means of a pair of plates between which the rubber ends of the bag are clamped, the clamping means being a tubular element having an enlarged element thereon for engaging the outside plate, the inner end of the tubular element being threaded through the inner plate so that the said enlarged element engages the outer plate so as to produce the clamping effect between the two plates, the tubular element at each end of the bag providing a means of admitting steam under pressure into said bag at one end thereof and draining condensed steam from the other end thereof and means for definitely holding the ends of the bag against movement to prevent elongation of the bag when the bag is inflated with steam pressure said means for definitely holding the ends of the bag comprising a curved rigid frame element having a head on each end thereof, said bag and end plates thereon being positioned between said heads, the engaging faces of said heads and plates being formed so that one will receive the other for definitely holding the bag in a predetermined fixed position in the said frame, said heads having openings therethrough for the passage of the tubular elements on the ends of the bag.

2. A curing bag device for tire section molds having a curved shoe thereon for the support of a tire and curing bag, said device comprising an expandible curing bag having the shape of a segment of a circle, a rigid frame element positioned outside the bag and shaped to engage both ends of the bag, a curved shoe against which the bag and beads of a tire may rest so as to properly position the bag within the tire for the performance of the repair to be made, and means on said frame element to secure said shoe in proper position.

3. In a curing bag device for repairing tire sections as defined in claim 1, said means for definitely holding the ends of the bag comprising a curved rigid frame element positioned outside the bag and having a head on each end thereof, said bag and end plates thereon being positioned between said heads, the engaging faces of said heads and plates being formed so that one receives the other for definitely holding the bag in a predetermined fixed position in the said frame, said heads having openings therethrough for the passage of the tubular elements on the ends of the bag, said bag being attachable and detachable from said frame element and being held in position between the said heads by reason of longitudinal pressure of the expandible rubber bag.

4. In a curing bag device for tire section repair as defined in claim 2, said curved shoe being a curved element fitted between the end portions of the frame to function as a tire and curing bag support as shown and described.

IRWIN F. PROAPS.